(12) United States Patent
Marshall

(10) Patent No.: US 6,766,303 B2
(45) Date of Patent: Jul. 20, 2004

(54) METHOD FOR HEDGING ONE OR MORE LIABILITIES ASSOCIATED WITH A DEFERRED COMPENSATION PLAN

(75) Inventor: David J. Marshall, Milan, NY (US)

(73) Assignee: Goldman Sachs & Co., New York, NY (US)

(*) Notice: Subject to any disclaimer, the term of this patent is extended or adjusted under 35 U.S.C. 154(b) by 85 days.

(21) Appl. No.: 09/977,813

(22) Filed: Oct. 15, 2001

(65) Prior Publication Data

US 2002/0174044 A1 Nov. 21, 2002

Related U.S. Application Data

(60) Provisional application No. 60/291,390, filed on May 16, 2001.

(51) Int. Cl.[7] .............................................. G06F 17/60
(52) U.S. Cl. ........................................ 705/36; 705/35
(58) Field of Search ............... 705/35–37; G06F 15/00, G06F 17/60

(56) References Cited

U.S. PATENT DOCUMENTS

| | | |
|---|---|---|
| 5,903,879 A | 5/1999 | Mitchell |
| 5,918,218 A | 6/1999 | Harris et al. |
| 5,991,744 A | 11/1999 | DiCresce |
| 5,999,917 A | 12/1999 | Facciani et al. |
| 6,161,096 A | 12/2000 | Bell |
| 6,205,434 B1 | 3/2001 | Ryan et al. |

FOREIGN PATENT DOCUMENTS

WO    WO 97/43893    * 11/1997    .......... G06F/15/00

OTHER PUBLICATIONS

Finnerty, John D "The PriceWaterhouseCoopers Credit derivatives Primer: Total Return swaps" Financier V7n1–4 PP 66–77 2000.*

A glossary of derivatives market terms "Corporate Finance Risk Management Yearbook 1995" pp I–L.*

Saunders Anthony, Credit Risk Measurement, May 1999, John Wiley & Sons, Inc., First Edition, pp. 186–204.*

Interpretative Letter #878; Jan. 2000 (Comptroller of the Currency, Administrator of National Banks).

* cited by examiner

Primary Examiner—Vincent Millin
Assistant Examiner—Narayanswamy Subramanian
(74) Attorney, Agent, or Firm—Greenberg Traurig LLP

(57) ABSTRACT

The present invention relates to a method for hedging a deferred compensation liability. In one embodiment, the invention may provide a mechanism to hedge the compensation expense liabilities of an employer providing deferred compensation to one or more employees.

1 Claim, 3 Drawing Sheets

METHOD FOR HEDGING ONE OR MORE LIABILITIES ASSOCIATED WITH A DEFERRED COMPENSATION PLAN

CROSS-REFERENCE TO RELATED APPLICATIONS

This application is a non-provisional of a provisional application, U.S. application Ser. No. 60/291,390, filed May 16, 2001.

FIELD OF THE INVENTION

The present invention relates to a method for hedging a deferred compensation liability. In one embodiment, the invention may provide a mechanism to hedge the compensation expense liabilities of an employer providing deferred compensation to one or more employees.

BACKGROUND OF THE INVENTION

A conventional deferred compensation plan is a mechanism by which an executive or other employee of a company may elect to defer payment of compensation until a later date. Taxation of the income to the employee, and the employee's deduction, are typically delayed until payment of the deferred compensation is actually made. Further, the deferred compensation plan is typically offered through a non-qualified deferred compensation arrangement (i.e., a plan which is not described under section 404(a)(1), (2),or (3) of the U.S. Internal Revenue Code of 1986, as amended (hereinafter the "Code")) which is accounted for without a specific amount set aside in trust. Of note, when participant investment direction is permitted, many conventional non-qualified deferred compensation plans offer the plan participants market-based investment benchmarks similar to investment options under a 401(k) program. That is, conventional non-qualified deferred compensation plans offer the plan participants (e.g., employee(s)) the ability to receive a return on deferred compensation as if their deferred compensation were invested in one or more market-based benchmarks such as the S&P 500, the Russell 2000, and/or a particular mutual fund (hereinafter generically referred to as "Mutual Fund A" or "Mutual Fund B"). Although the employee is entitled to receive a payout equal to the value of its deferred compensation as if such amounts were invested in the selected investment benchmarks, neither the employer nor anyone else is under any obligation to actually purchase the benchmark investments. In this way, the employee's deferred compensation may be said to be "notionally" invested in the benchmark investments.

In one specific example of the operation of a conventional deferred compensation plan, an employee may defer $100 of compensation (i.e., the employee will not take the deferred compensation as income) and the employee may elect to receive a return on the deferred amount as if the deferred amount were invested in one or more benchmark investments specified by the deferred compensation plan. The plan allows employees to change periodically the manner in which their deferred compensation is notionally invested prior to the payout date. For example, an employee might defer $100 of compensation and elect to receive a return on that amount as if it were invested in Mutual Fund A. One year later, the value of such an investment might be $110 (such amount is typically known as the employee's "plan balance"). At that time the employee might change its notional investment to reflect a return on its plan balance as if that balance were invested in Mutual Fund B. At the payout date, the employee typically would be entitled to receive an amount equal to its plan balance at that time. This amount due at the payout date represents a liability (hereinafter "NQDC Liability") to the employee owed by the employer. However, it is understood that NQDC plans are unfunded promises to pay. The employee has no rights of ownership in any asset, hedge, etc. used by an employer to hedge or offset balance sheet liabilities.

Employers have traditionally dealt with NQDC Liabilities in any of several ways. Some employers do not hedge their NQDC Liabilities at all and simply expect to fund the payout from operating profits or other sources, such as borrowings, when due. This presents considerable risk and uncertainty for the employer.

Alternatively, an employer may hedge its NQDC Liabilities by actually purchasing the assets selected by the employee as notional investments, i.e., a $100 investment in Mutual Fund A in the immediately preceding example. Such a purchase, however, requires an immediate investment of cash by the employer and therefore ties up capital that could otherwise be used to finance operation of the employer's business. Further, an employer may generate taxable income prior to the payout date if the employer adjusts its hedge to accommodate changes in employees' notional investments prior to the payout date. For example, if an employee initially elected to receive the return on deferred compensation as if deferred amounts were invested in Mutual Fund A and then, at some later date, elected to receive a return on the then value of such amounts as if they were invested in Mutual Fund B, the employer might decide to hedge its NQDC Liability in respect of such employee by selling its original investment in Mutual Fund A and making an investment in Mutual Fund B. If at the time of that sale Mutual Fund A had increased in value, the employer might have taxable income equal to the amount of that increase.

Alternatively, an employer may hedge NQDC Liabilities by purchasing corporate-owned life insurance, which, like a purchase of physical assets as described immediately above, has the disadvantage of requiring a cash outlay.

In one financial area which had traditionally been unrelated to such deferred compensation plans, a conventional "Swap" (e.g., a Total Return Swap) has been utilized by an investor to gain exposure to the appreciation or depreciation of an asset. More particularly, as seen in FIG. 1, a Total Return Swap may be a bilateral financial contract in which a Party 101 agrees to pay a Counterparty 103 the "total return" of an underlying asset or assets, traditionally in return for receiving a London Inter-Bank Offering Rate ("LIBOR") based cash flow. The LIBOR-based cash flow generally is designed to compensate Party 101 for any borrowing of money it might need in order to purchase the underlying asset or assets. It is noted that throughout the present application a transaction may be described as relating to two parties (e.g., a party and a counterparty). In any case, the LIBOR based cash flow may, of course, include a desired spread. The Total Return Swap was typically applied to equity indices, single stocks, bonds, and defined portfolios of loans and/or mortgages. In essence, the Total Return Swap provides a mechanism for a user to accept the economic benefit/liability of asset ownership without requiring the purchase of those assets. Of note, the return associated with owning the underlying asset(s) and the return associated with the Total Return Swap are essentially the same, with the difference being the LIBOR based cash flow made by Counterparty 103.

In one particular type of Total Return Swap, an equity contract may provide for payments between a party and a counterparty based on the product of a "notional principal amount" multiplied by the price or value of one or more specified equities. For example, party A and counterparty B might agree that:

(1) party A will pay counterparty B: (i) every 3 months, the product of some negotiated interest rate multiplied by the contract's notional principal amount; and (ii) at the termination of the swap, an amount equal to the excess, if any, of the notional principal amount over the value of the notional principal amount on the termination date if invested in equity X from the commencement of the contract; and (2) counterparty B will pay party A at the termination of the swap an amount equal to the excess, if any, of the value of the notional principal amount if invested at the commencement of the contract in equity X over the contract's notional principal amount.

In another financial area, which had traditionally been unrelated to deferred compensation plans, a forward contract has been used. A physically settled forward contract is an agreement to deliver a particular commodity at a future date at an agreed price. Alternatively, a cash-settled forward contract entitles the holder to receive from the seller an amount of cash equal to the excess, if any, of the commodity's price when the contract expires over the contract price and obligates the holder to pay the seller an amount equal to the excess, if any, of the contract price over the commodity's price when the contract expires. Depending upon the terms of the forward contract, payment may be made when the contract is created or, more typically, when the contract expires.

Further, an option contract is essentially identical to a forward contract, except that delivery and payment of the purchase price (known as the option's "strike price") occurs at the discretion of the holder of the option. The party that is obligated to perform if the holder exercises the option is the writer of the option. A call option is an option contract that, if exercised, obligates the writer to deliver a commodity at a specified price. Alternatively, a cash-settled call, if exercised, obligates the writer to pay the holder an amount of cash equal to the excess, if any, of the commodity's price at the future date over the option's strike price. A put is an option contract that, if exercised, obligates the writer to take delivery of a commodity at a future date at a specified price. Alternatively, a cash-settled put, if exercised, obligates the writer to pay the holder an amount of cash equal to the excess, if any, of the option's strike price over the commodity's price at the future date. Because the writer of an option obligates itself to perform at the discretion of the option's holder, the writer receives from the initial purchaser a premium, which is typically paid at the time the option is entered into but may be paid over time.

Further still, a forward contract may be constructed of paired put and call options, which had traditionally been unrelated to deferred compensation plans, where one of the options is held and the other option (of the same duration and strike price as the held option) is written. Described differently, holding a call and writing a corresponding put is generally the economic equivalent of holding a forward contract with a duration equal to the options' duration and a contract price equal to the options' strike price. For example, assume person A holds a forward contract that requires A to purchase 1 lot of commodity X for $100 on date Y. On date Y, A would pay $100 and receive 1 lot of commodity X, regardless of whether the market price of such lot was $90 or $110 on that date. Similarly, if instead A held a call and wrote a put, both of which expired on date Y and both of which had a strike price of $100, A would, on date Y, also pay $100 and receive 1 lot of X. If the market price of 1 lot of X on such date were $110, A would exercise its call (thus paying $100 and receiving 1 lot of X), while the put would go unexercised (because it would be irrational to exercise a contractual right to sell X at $100 when X could be sold in the market at $110). If the market price of 1 lot of X on date Y were $90, the put that A wrote would be exercised (thus obligating A to pay $100 and receive 1 lot of X), and A would not exercise its call (because it would be irrational to exercise a contractual right to purchase X at $100 when X could be purchased in the market at $90).

Nevertheless, while a cash-settled call has been used (without the sale of a corresponding put) to hedge non-qualified deferred compensation liabilities with respect to an employer's own stock, no conventional mechanism exists for permitting an employer providing, or sponsoring, a non-qualified deferred compensation plan to hedge the compensation liabilities via the use of a forward contract comprising paired put and call options.

Figure 1:
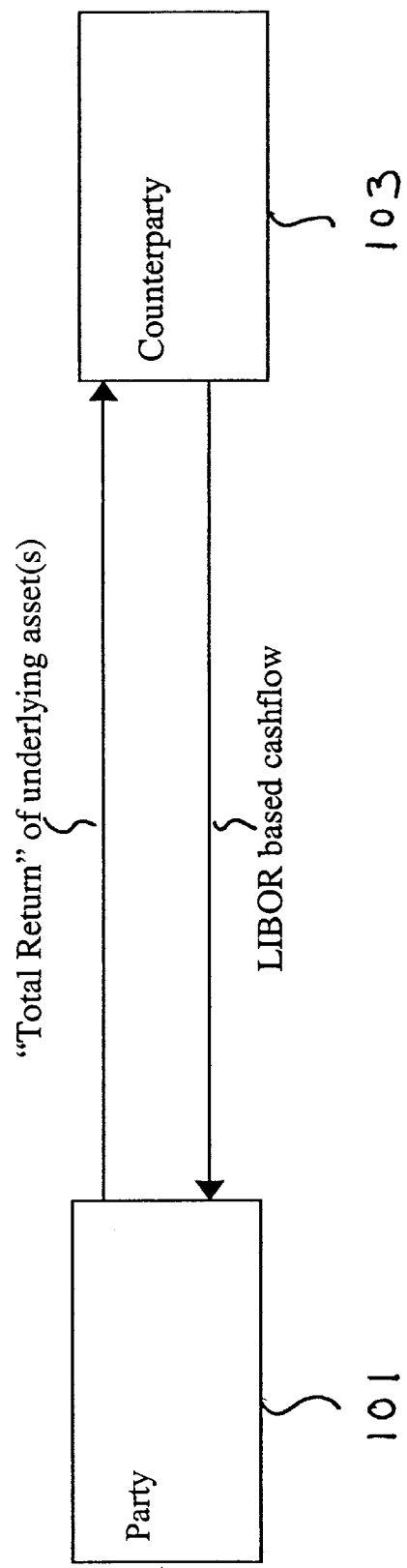
FIG. 1 shows the structure of a conventional Total Return Swap.

Among those benefits and improvements that have been disclosed, other objects and advantages of this invention will become apparent from the following description taken in conjunction with the accompanying figures. The figures constitute a part of this specification and include an illustrative embodiment of the present invention and illustrate various objects and features thereof.

DETAILED DESCRIPTION OF THE INVENTION

As required, detailed embodiments of the present invention are disclosed herein; however, it is to be understood that the disclosed embodiments are merely illustrative of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment, a method for hedging a deferred compensation liability associated with a deferred compensation plan is provided, comprising: arranging a total return swap between a party sponsoring the deferred compensation plan and a counterparty; and using the total return swap to hedge the deferred compensation liability.

In one specific example, a participant in the deferred compensation plan may select a notional investment allocation of deferred compensation attributable to the participant. The counterparty may arrange the total return swap to substantially track the selected notional investment allocation. The party sponsoring the deferred compensation plan may receive from the counterparty a total return (i.e. periodic value based payment generated by the total return swap and the counterparty may receive from the party sponsoring the deferred compensation plan a total return swap fee. The total return swap fee may comprise a LIBOR based cashflow.

In another embodiment, a method for hedging a deferred compensation liability associated with a deferred compensation plan, which deferred compensation plan permits a participant in the deferred compensation plan to select a notional investment allocation of deferred compensation attributable to the participant, is provided, comprising: obligating a counterparty to pay to a party sponsoring the deferred compensation plan a hedge payment, wherein the hedge payment results from a total return swap and equals at least the value of the deferred compensation if it were invested as notionally selected by the plan participant.

In one specific example, the hedge payment may be a total return generated by the total return swap and the counterparty may receive from the party sponsoring the deferred compensation plan a total return swap fee. The total return swap fee may comprise a LIBOR based cashflow.

In another embodiment, a method for hedging a deferred compensation liability associated with a deferred compensation plan is provided, comprising: arranging a first total return swap between a party sponsoring the deferred compensation plan and a counterparty; using the first total return swap to hedge the deferred compensation liability; and arranging a hedge between the counterparty and a second counterparty, wherein the hedge at least partially hedges the counterparty's liability under the first total return swap.

In one specific example, a participant in the deferred compensation plan may select a notional investment allocation of deferred compensation attributable to the participant. The counterparty may arrange the first total return swap to substantially track the selected notional investment allocation. The party sponsoring the deferred compensation plan may receive from the counterparty a total return generated by the first total return swap and the counterparty may receive from the party sponsoring the deferred compensation plan a total return swap fee. The total return swap fee may comprise a LIBOR based cashflow. The counterparty's hedge may be a second total return swap which is between the counterparty and a second counterparty. The counterparty may receive from the second counterparty a total return generated by the second total return swap and the second counterparty may receive from the counterparty a total return swap fee. The total return swap fee may comprise a LIBOR based cashflow.

In another embodiment, a method for hedging a deferred compensation liability associated with a deferred compensation plan, which deferred compensation plan permits a participant in the deferred compensation plan to select a notional investment allocation of deferred compensation attributable to the participant is provided, comprising: obligating a counterparty to pay to a party sponsoring the deferred compensation plan a hedge payment, wherein the hedge payment results from a first total return swap and equals at least the value of the deferred compensation if it were invested as notionally selected by the plan participant; and arranging a hedge between the counterparty and a second counterparty, wherein the hedge at least partially hedges the counterparty's liability under the first total return swap.

In one specific example, the counterparty may arrange the first total return swap to substantially track the selected notional investment allocation. The hedge payment may be a total return generated by the first total return swap and the counterparty may receive from the party sponsoring the deferred compensation plan a total return swap fee. The total return swap fee may comprise a LIBOR based cashflow. The hedge may be a second total return swap which is between the counterparty and a second counterparty. The counterparty may receive from the second counterparty a total return generated by the second total return swap and the second counterparty may receive from the counterparty a total return swap fee. The total return swap fee may comprise a LIBOR based cashflow.

In another embodiment, a method for hedging a deferred compensation liability associated with a deferred compensation plan is provided, comprising: arranging a forward contract including a put and a call between a party sponsoring the deferred compensation plan and a counterparty; and using the forward contract to hedge the deferred compensation liability.

In one specific example, the put may be written by the party sponsoring the deferred compensation plan and the call may be held by the party sponsoring the deferred compensation plan. The put and the call may be on stock in the party sponsoring the deferred compensation plan.

In summary, one embodiment of the present invention provides a mechanism to hedge the compensation expense liabilities of an employer providing a deferred compensation plan to one or more employees. In one specific example, which is intended to be illustrative and not restrictive, the employer may be a publicly held corporation with one or more non-qualified deferred compensation plans. In another specific example, which again is intended to be illustrative and not restrictive, the employer may enter into a hedging agreement with a counterparty to hedge some or all of the employer's liabilities under the non-qualified deferred compensation plan (and such counterparty may in turn hedge some or all of its liabilities associated with the hedging agreement with the employer with one or more additional counterparties (or "Balance Sheet Providers")).

Figure 2:
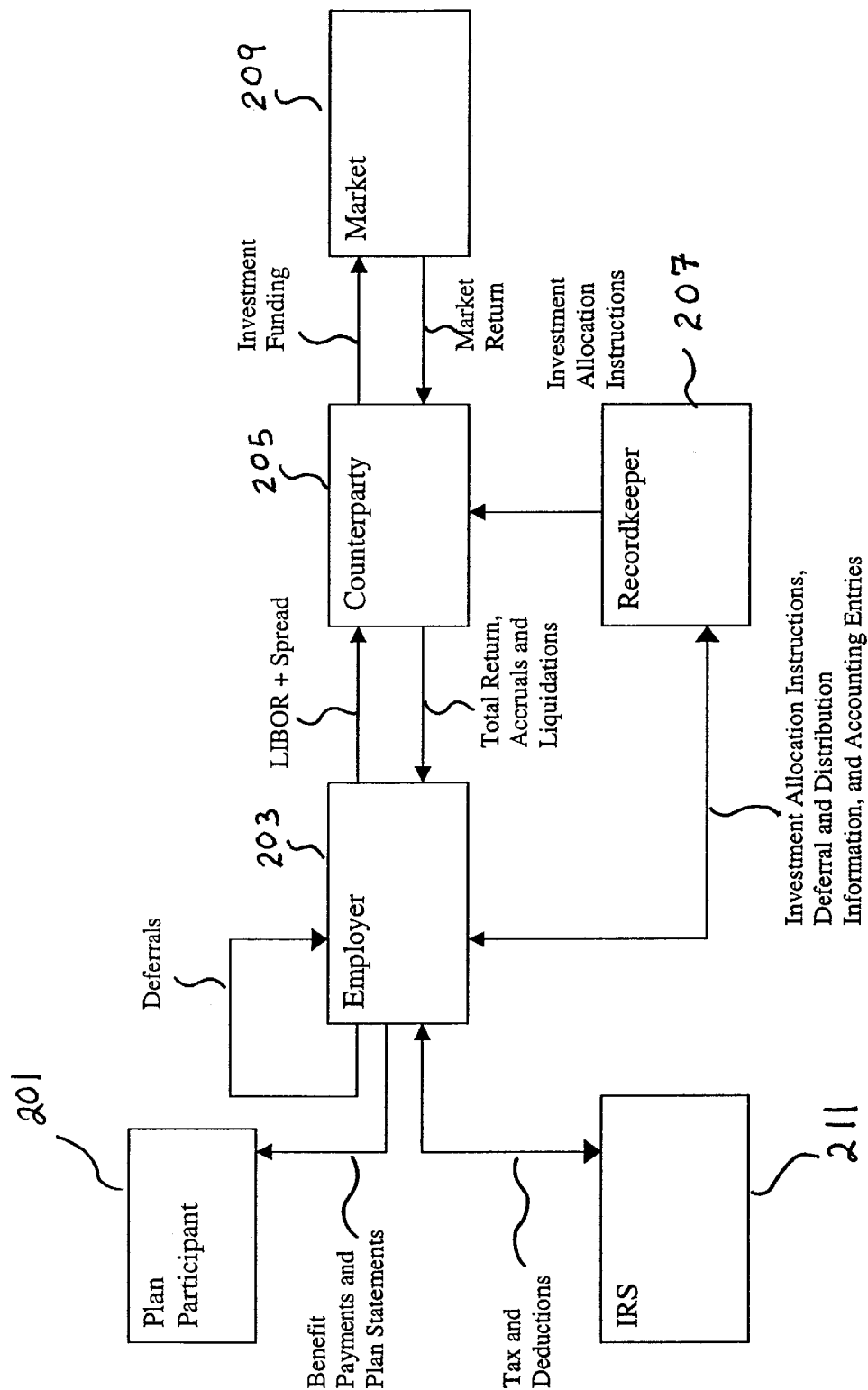
FIG. 2 shows a block diagram of a deferred compensation liability hedging mechanism according to an embodiment of the present invention.

Referring now to FIG. 2, a block diagram of a deferred compensation liability hedging mechanism according to an embodiment of the present invention is shown. As seen in this FIG. 2, Plan Participant 201 (e.g., an employee) may be enrolled in a deferred compensation plan sponsored by Employer 203, whereby certain "Deferrals" (i.e., compensation payments) which would ordinarily be made to Plan Participant 201 are deferred until paid at a later date as "Benefit Payments". "Plan Statements" may also be provided to Plan Participant 201 detailing, among other things, "Deferrals" and/or "Benefit Payments".

Further still, Counterparty 205 may enter into a Total Return Swap with Employer 203. The Total Return Swap may require payment of a fee to Counterparty 205 (e.g., a one-time or periodic LIBOR based fee, such as LIBOR+a spread) as well as payment of the Total Return Swap's "total return" to Employer 203 (which may be paid in a lump sum at the end of the Total Return Swap, for example). It is noted that the selection of the underlying asset(s) involved in the Total Return Swap may be determined as described below.

In addition, Recordkeeper 207 may communicate with Employer 203 to transfer certain information including, but not limited to, investment allocation instructions (e.g., notional investment allocation instructions) made by Plan Participant 201 (which may be given to Employer 203 by Plan Participant 201 but which are not shown in this FIG. 2), deferral and distribution information associated with Plan Participant 201, and accounting entries such as statement/benefit accounting entries associated with Plan Participant 201. Moreover, in one embodiment, Recordkeeper 207 may communicate with Counterparty 205 to provide to Counterparty 205 certain instructions including, but not limited to, the investment allocation instructions made by Plan Participant 201.

Counterparty 205 may then use the investment allocation instructions to structure the Total Return Swap. Of note, under this embodiment of the present invention, Counterparty 205 is obligated to adjust the Total Return Swap to reflect investment instructions, but Counterparty 205 is not obligated to invest in the assets identified in the investment instruments. Described differently, the Total Return Swap obligates Counterparty 205 to pay a Total Return to Employer 203 as if Counterparty 205 invested in those assets, regardless of whether Counterparty 205 actually invests in the assets.

In this regard, Counterparty 205 may (but is not required to) either partially or fully ("perfectly") hedge its liabilities under the Total Return Swap by purchasing one or more assets (not shown) in Market 209 such that the purchased assets essentially track some or all of the investment allocations made by the Plan Participant 201. On the other hand, Counterparty 205 may go unhedged with regard to its liabilities under the Total Return Swap. In either case, the Total Return Swap would provide a total return to Employer 203 essentially corresponding to a return which would have been provided by the assets indicated in the investment allocation instructions made by the Plan Participant 201.

Finally, in an embodiment, Employer 203 may communicate with IRS 211 (i.e., the Internal Revenue Service) to transfer, among other things, any required tax on any gain from the Total Return Swap when liquidated and/or any required tax on any Benefit Payments actually made.

Figure 3:
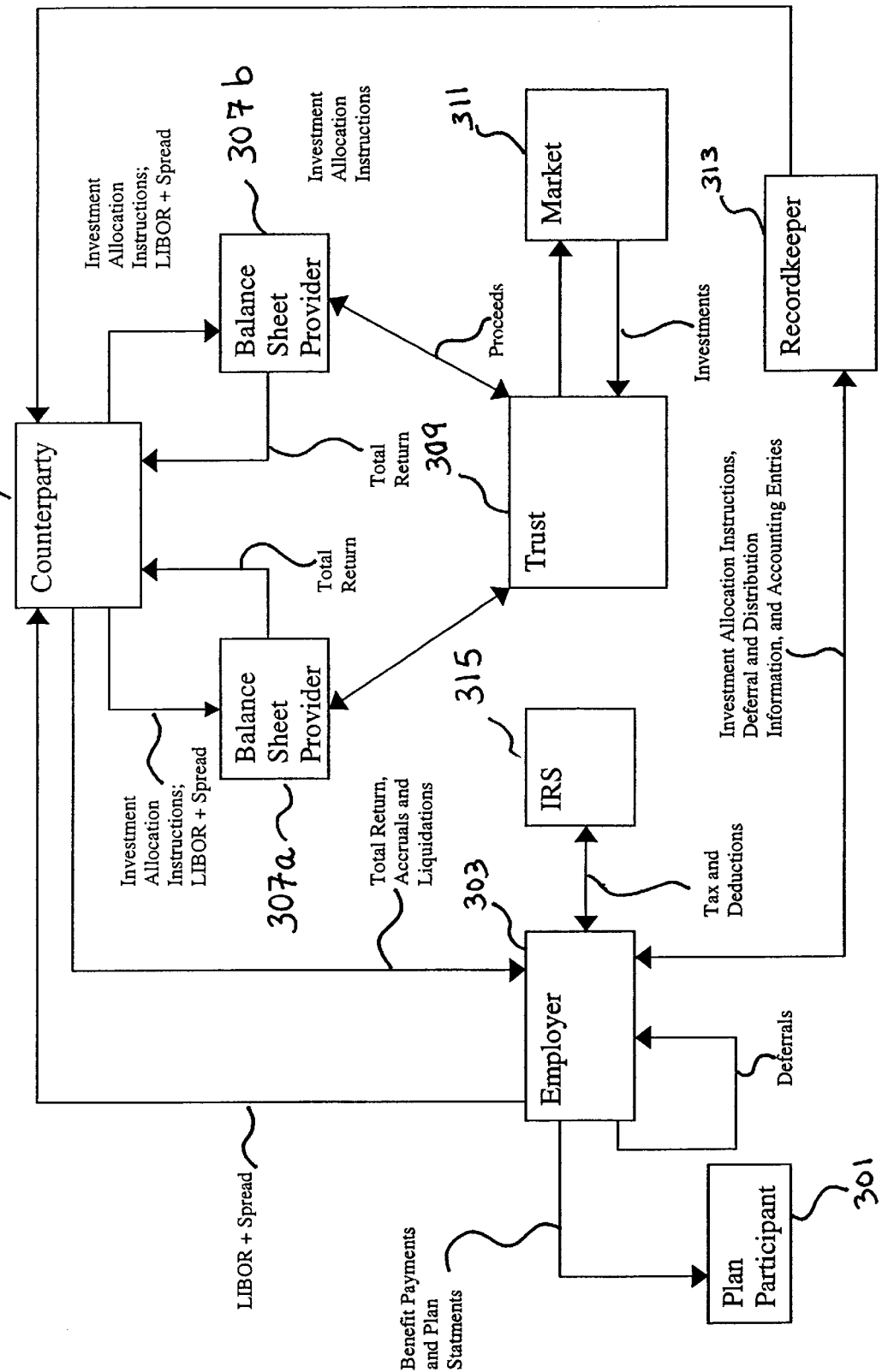
FIG. 3 shows a block diagram of a deferred compensation liability hedging mechanism according to an embodiment of the present invention.

Referring now to FIG. 3, a block diagram of a deferred compensation liability hedging mechanism according to another embodiment of the present invention is shown. As seen in this FIG. 3, Plan Participant 301 (e.g., an employee) may be enrolled in a deferred compensation plan sponsored by Employer 303, whereby certain "Deferrals" (i.e., compensation payments) which would ordinarily be made to Plan Participant 301 are deferred until paid at a later date as "Benefit Payments". "Plan Statements" may also be provided to Plan Participant 301 detailing, among other things, "Deferrals" and/or "Benefit Payments".

Further still, Counterparty 305 may enter into a Total Return Swap with Employer 303. The Total Return Swap may require payment of a fee to Counterparty 305 (e.g., a one-time or periodic LIBOR based fee, such as LIBOR+a spread) as well as payment of the Total Return Swap's "total return" to Employer 303 (which may be paid in a lump sum at the end of the Total Return Swap, for example). It is noted that the selection of the underlying asset(s) involved in the Total Return Swap may be determined as described below.

In addition, Counterparty 305 may hedge some or all of its liabilities to Employer 303 under the Total Return Swap by entering into its own hedging agreement(s) (such as one or more Total Return Swaps) with each of Balance Sheet Provider 307a and Balance Sheet Provider 307b (wherein each of Balance Sheet Provider 307a and 307b acts as an additional "counterparty" to Counterparty 305). Of note, two (or more) Balance Sheet Providers (each of which may be any desired third party) may be used to help to avoid consolidation for accounting purposes (although one Balance Sheet Provider may, of course, be used if desired). In one embodiment, each of Balance Sheet Provider 307a and Balance Sheet Provider 307b may have an interest (such as an equity interest) in Trust 309, which in turn may invest in Market 311 (in another embodiment, one or both of Balance Sheet Providers 307a and 307b may invest directly in Market 311 without utilizing a trust). Counterparty 305 may receive from each of Balance Sheet Provider 307a and Balance Sheet Provider 307b a total return (based upon each Balance Sheet Provider's interest in Trust 309 or in Market 311) and Counterparty 305 may pay to each of Balance Sheet Provider 307a and Balance Sheet Provider 307b an agreed payment (e.g., a one-time or periodic LIBOR+Spread payment). Counterparty 305 may, of course, receive and/or pay a fee (e.g., a fixed fee or a percentage fee) from/to Employer 303 and/or Balance Sheet Provider 307a and/or Balance Sheet Provider 307b. It is noted that the selection of the underlying asset(s) involved in the Total Return Swaps may be determined as described below.

In addition, Recordkeeper 313 may communicate with Employer 303 to transfer certain information, including, but not limited to, investment allocation instructions (e.g., notional investment allocation instructions) made by Plan Participant 301 (which may be given to Employer 303 by Plan Participant 301 but which are not shown in this FIG. 3), deferral and distribution information associated with Plan Participant 301, and accounting entries such as statement/benefits accounting entries associated with Plan Participant 301. Moreover, in another embodiment, Recordkeeper 313 may communicate with Counterparty 305 to provide to the Counterparty 305 certain instructions, including, but not limited to, the investment allocation instructions made by Plan Participant 301.

The investment allocation instructions may be used to structure the various hedges (e.g., the Total Return Swap between Counterparty 305 and Employer 303 and the Total Return Swap(s) between Counterparty 305 and Balance Sheet Providers 307a and 307b). Of note, under this embodiment of the present invention, as discussed with regard to the embodiment shown in FIG. 2, Counterparty 305 is obligated to adjust the Total Return Swap with Employer 303 to reflect investment instructions, but Counterparty 305 is not obligated to invest in the assets identified in the investment instructions. In other words, the Total Return Swap obligates Counterparty 305 to pay a Total Return to Employer 303 as if Counterparty 305 invested in the assets, regardless of whether Counterparty 305 actually invests in those assets. Likewise, if Counterparty 305 chooses to hedge, on its own behalf, its liabilities under the Total Return Swap to Employer 303 (e.g., via one or more Total Return Swaps with Balance Sheet Providers 307a and 307b), then each of Balance Sheet Providers 307a and 307b may (but is not required) to either partially or fully ("perfectly") hedge its liabilities under the Total Return Swap(s) with Counterparty 305 by purchasing appropriate assets. Alternatively, Balance Sheet Providers 307a and/or 307b may go unhedged with regard to their liabilities to Counterparty 305 under the Total Return Swap(s). In either case, the Total Return Swap between Employer 303 and Counterparty 305 would provide a total return to Employer 303 essentially corresponding to a return which would have been provided by the assets indicated in the investment allocation instructions made by the Plan Participant 301.

Finally, in an embodiment, Employer 303 may communicate with IRS 315 (i.e., the Internal Revenue Service) to transfer, among other things, any required tax on any gain from the Total Return Swaps when liquidated and/or any required tax on any Benefit Payments actually made.

One specific example of a deferred compensation plan according to the present invention, which specific example is intended to be illustrative and not restrictive, will now be described. In this specific example the deferred compensation plan may be a non-qualified deferred compensation plan (which may be provided to one or more employees) and the employer may deduct the value of deferred contribution distributions to the plan only in the taxable year in which such amounts are includable in the income of a participating employee.

Further, in this specific example the employee may have only an unsecured claim against the employer in the amount of his or her account balance in the plan (i.e., an employee may have no proprietary or security interest in any assets of the employer).

Further still, in this specific example the plan may provide an employee with the right to notionally invest the employee's plan balance in any one or more of selected publicly-available, open-end mutual funds (the "Reference Funds"), wherein the employee's plan balance may grow or decline in accordance with his or her investment allocations, as if the employee had actually invested the plan balance in such funds. It is noted, however, that as notional investments an employee may have no proprietary or security interest in any of the Reference Funds underlying his or her investment allocations.

Further still, in this specific example an employee may periodically change his or her investment allocations (e.g., every week, once every two weeks, once every month, once every two months, once every quarter, twice a year, or once a year). In addition, the plan may permit the employer to periodically revise the list of Reference Funds available for notional investment (e.g., every week, once every two weeks, once every month, once every two months, once every quarter, twice a year, or once a year). Such revision of the list of Reference Funds may be performed as of a specified date for each interval.

Further still, in this specific example dividends and other distributions on an employee's notional Reference Fund investments may be automatically notionally reinvested in the corresponding Reference Funds.

Further still, in this specific example the employer's liability under the plan, when an employee has the right to payment under the plan, may equal the value of the employee's balance as notionally invested pursuant to his or her investment allocations.

Further still, in this specific example an unrelated third-party provider may perform record keeping and/or other administrative tasks with respect to the plan for the benefit of the employer and/or its employees.

One specific example of a hedging agreement according to the present invention, which specific example is intended to be illustrative and not restrictive, will now be described. In this specific example the hedging agreement may cover only the employer's compensation expense liabilities attributable to notional investments in the Reference Funds.

Further still, in this specific example the hedging agreement may take the form of a total return swap between the employer and a counterparty with respect to the employer's aggregate plan liabilities for all employees.

Further still, the swap may be documented according to standard market practice as a confirmation issued pursuant to an International Swaps and Derivatives Association ("ISDA") Master Agreement between the employer and the counterparty.

As stated above, a hedging mechanism according to the present invention may provide a total return swap which may be documented as a swap in accordance with standard commercial practice. As such, the employer may have none of the legal rights of being a shareholder in any of the Reference Funds. More particularly, the employer may: (i) not be able to vote in any shareholder vote held by any of the Reference Funds; (ii) not be able to direct the counterparty to vote on its behalf; (iii) not have the right to any cash distributions made by any of the Reference Funds, as would a shareholder in any of those funds (such cash distributions may be deemed reinvested for purposes of the swap); (iv) have recourse only to the counterparty under each swap (and not to any of the Reference Funds); (v) not have a security interest in any of the Reference Funds (thus having credit exposure only to the counterparty and not to any of the Reference Funds).

Further still, in this specific example the swap may include in one or more annexes: (i) a list of the Reference Funds, revised periodically (e.g., every week, once every two weeks, once every month, once every two months, once every quarter, twice a year, or once a year) to reflect the employer's changes to the list, if any; (ii) the aggregate notional principal amount deemed invested in each Reference Fund, revised periodically (e.g., every week, once every two weeks, once every month, once every two months, once every quarter, twice a year, or once a year) to reflect the employees' aggregate changes to their investment allocations (wherein the aggregate notional principal amount deemed invested in each Reference Fund may be accounted for as of the same date that such changes take effect); and (iii) each employee's plan balance, as notionally invested in the Reference Funds in accordance with his or her investment allocations (wherein such investment allocations may be revised periodically (e.g., every week, once every two weeks, once every month, once every two months, once every quarter, twice a year, or once a year) to take into account investment allocation changes).

Further still, in this specific example the swap may be viewed as an aggregate of many smaller, individual swaps (or "mini-swaps"), each of which mini-swaps may relate to the employer's plan liability with respect to a particular Employee.

Further still, in this specific example the swap (and/or each mini-swap) may have a maturity date (e.g.,10 years), but the employer may have the unilateral right to terminate the swap (and/or each mini-swap) and settle the payment rights and obligations described below (without any penalty), when the employer's obligation to pay the employee his or her plan balance is triggered.

Further still, in this specific example the pricing of each swap (and/or each mini-swap) may be on-market at initiation and thus require neither the employer nor the counterparty to make any upfront payments.

Further still, in this specific example the notional principal amount of the swap (and/or each mini-swap) may be indexed to the Reference Funds to which the employee has allocated his or her plan balance, and the swap (and/or each mini-swap) may provide that the Reference Funds will be changed automatically to match any changes made by the employee to his or her investment allocations (as of the effective date of such changes for purposes of the plan).

Further still, in this specific example the employer may make periodic payments under the swap (and/or each mini-swap) to the counterparty equal to LIBOR plus a spread applied to the swap's (and/or each mini-swap's) notional principal amount (i.e., the employee's notional account balances under the plan). The employer also may make a payment at the end of the swap's (and/or each mini-swap's) term (or upon early termination) equal to the excess, if any, of the employee's opening plan balance (as of the date of the swap (and/or each mini-swap)) over the employee's ending plan balance as of the swap's (and/or the mini-swap's) maturity or early termination date.

Further still, in this specific example the counterparty may make a single payment to the employer at the end of the swap's (and/or each mini-swap's) term (or upon early termination) equal to the excess, if any, of the employee's ending plan balance as of the swap's (and/or each mini-swap's) maturity or early termination date over the employee's opening plan balance (as of the date of the swap (and/or each mini-swap)).

Further still, in this specific example the counterparty may not be required to pledge any collateral to the employer for its obligations under the swap (and/or each mini-swap), or hedge its position under the swap (and/or each mini-swap) in any manner. Thus, the swap (and/or each mini-swap) may hedge as an economic matter (and as a tax matter) an employer's liabilities to its employees under its deferred compensation plan.

Further still, in this specific example the employer may instruct the plan recordkeeper to send copies of its periodic statements with respect to the plan to the counterparty at the same time it sends them to the employer. Such statements may contain information regarding the employee's current and prior period plan balances as notionally invested in each Reference Fund and any changes in the employee's investment allocations (and the amounts reallocated). The plan administrator may not necessarily be permitted to perform any other function with respect to the hedging agreement.

Further still, in this specific example the employer may, as a result of entering into the hedging agreement (that is, each swap (and/or each mini-swap)), have recourse and credit exposure only to the counterparty with respect to the employer's rights under the hedging agreement.

Further still, in this specific example the counterparty may hedge its risks on the swap (and/or each mini-swap) without being required to hedge such risks. The counterparty may do so by acquiring direct interests in the Reference Funds; any hedging by the counterparty may be handled by the same personnel and in the same manner that other equity derivatives activities are hedged; and under no circumstances may the counterparty acquire legal or beneficial ownership of any position in the Reference Funds held at the outset of the hedging agreement by the employer (i.e., the Reference Funds may not be purchased from the employer).

Further still, in this specific example the counterparty may hedge its obligations under the hedging agreement by entering into one or more back-to-back swaps with another swaps dealer (which swaps dealer shall not be affiliated with the employer in one specific example). In this case, the swaps dealer that ultimately absorbs the market risks associated with the Reference Funds may be required to follow the same guidelines as the counterparty.

In another embodiment, a hedging mechanism according to the present invention may be used to reduce the risk of price changes of the Reference Fund(s) that determine the amount of the employer's plan liability to an employee.

In another embodiment, a hedging mechanism according to the present invention may provide a total return swap which may be treated as being terminated whenever an employee rebalances his or her notional investments in the Reference Fund(s) under the plan, wherein the employer may be deemed to have entered into a new swap with the new account balances (but with all other terms identical to the terminated swap).

In another embodiment, a hedging mechanism according to the present invention may provide a total return swap in which the counterparty may have entered into the swap in the ordinary course of its business as a swaps dealer. As such, the counterparty may not be required to hedge its risks with respect to the swap, and if it chooses to hedge such risks, it may do so in any manner consistent with its internal hedging policies and procedures. Further, the employer may have no rights with respect to the counterparty's hedging strategy for its swap position. If the counterparty does hedge its risks under the swap, it may do so for its own account in the ordinary course of its business as a swaps dealer (thus bearing fully any basis, timing or other hedging risks with respect to its swap position).

In another embodiment, a hedging mechanism according to the present invention may provide a total return swap which constitutes a notional principal contract for tax purposes and not a nominee ownership arrangement with respect to shares in the Reference Funds.

In another embodiment, a hedging mechanism according to the present invention may be used with a deferred compensation plan providing market-based investment benchmarks to plan participants.

In another embodiment, a hedging mechanism according to the present invention may be used with a deferred compensation plan which is marked-to-market and which would otherwise subject the plan sponsor to income statement volatility.

In another embodiment, a hedging mechanism according to the present invention may be used to provide "off balance sheet funding" in connection with a deferred compensation plan, wherein the plan sponsor may pay a predetermined payment (e.g., a LIBOR based payment) in exchange for market-based returns that are used to hedge plan liabilities.

In another embodiment, a hedging mechanism according to the present invention may be used with a deferred compensation plan to defer swap investment gains for tax purposes until the swap is liquidated to pay deferred compensation benefits.

In another embodiment, a hedging mechanism according to the present invention may help to immunize an employer against market fluctuations in market returns under a non-qualified deferred compensation plan.

In another embodiment, a hedging mechanism according to the present invention may provide a positive cash flow to an employer sponsoring a non-qualified deferred compensation plan, wherein the positive cash flow may generate present value gains for the employer.

In another embodiment, a hedging mechanism according to the present invention may provide accretive earnings to an employer sponsoring a non-qualified deferred compensation plan.

In another embodiment, a hedging mechanism according to the present invention may provide an employer sponsoring a non-qualified deferred compensation plan a deferred tax treatment for swap gains.

In another embodiment, a hedging mechanism according to the present invention may provide multiple investment options associated with a non-qualified deferred compensation plan sponsored by an employer.

In another embodiment, a hedging mechanism according to the present invention may provide a hedge under the Code (e.g., section 1221(b)(2)).

In another embodiment, a hedging mechanism according to the present invention may provide a counterparty the ability to provide an employer a hedge against a deferred compensation plan liability while in turn assuming risk (such as market risk) associated with the liability (wherein the counterparty may profit from the assumption of the risk).

In another embodiment, a contractual agreement may be reached wherein a party assumes risk in exchange for a payment (e.g., LIBOR plus a spread). Under this embodiment one of the parties is not accepting assets and in effect opening a party brokerage account borrowing from another's balance sheet.

In another embodiment, an employer entering into a Total Return Swap with a counterparty: (a) keeps funds which may otherwise have had to have been used to purchase underlying assets (thus maintaining access to capital that may be used for any desired purpose and not affecting the employer's balance sheet); (b) hedges the deferred compensation liability (i.e., the payout obligation to the employee); and (c) obtains a tax benefit.

In another embodiment, a counterparty entering into a Total Return Swap with an employer: (a) gets a payment (e.g., LIBOR plus a spread); and (b) gets a short position in the hedged assets (which position may in turn be partially or fully ("perfectly") hedged).

In another embodiment, an employer may enter into a Forward Contract with a counterparty, wherein the employer buys a call (on the employer's stock with a strike price equal to the then market price of the employer's stock) from the counterparty and sells a put (e.g., on the employer's stock and at the strike price of the employer's stock).

In another embodiment, an employer may enter into a Total Return Swap and/or a Forward Contract (including a pair of put/call options) with a counterparty.

In another embodiment, an employer may enter into a Total Return Swap with a counterparty on all of or part of the deferred compensation liabilities.

In another embodiment, an employer may enter into a Forward Contract (including a pair of put/call options) with a counterparty on all of or part of the deferred compensation liabilities.

In another embodiment, the Total Return Swap between the employer and the counterparty must directly reflect the appropriate value (e.g., employee invests $100 in stock A, at payout time stock A is $110 and counterparty must pay $10 to employer; on the other hand, if stock A is $90 at payout, then counterparty receives $10 from employer).

In another embodiment, a counterparty (e.g., a counterparty to the employer) may partially or fully ("perfectly") hedge by buying the underlying assets (which could affect the counterparty's balance sheet) and/or may hedge the liability to the employer (e.g., via a Total Return Swap and/or a Forward Contract).

In another embodiment, a counterparty (e.g., a counterparty to the employer) may have a short position relative to the employer and a long position relative to one or more other counterparties (e.g., one or more Balance Sheet Providers), wherein the balance sheet of the counterparty to the employer is not affected.

In another embodiment, a counterparty (e.g., a counterparty to the employer) may receive a payment (e.g., LIBOR plus 100) from the employer and may give a payment (e.g., LIBOR plus 50) to another counterparty, thereby locking in a fixed return.

In another embodiment, a Total Return Swap between a counterparty to the employer and another counterparty (e.g., a Balance Sheet Provider) is not required to reflect the employee's value (i.e., the Total Return Swap between the employer and the employer's counterparty).

In another embodiment, the employer places at least part of the credit risk on the employer's counterparty.

In another embodiment, a plan participant's desired investment allocation is communicated among the employer and/or the employer's counterparty and/or the recordkeeper and/or a balance sheet provider directly by the plan participant and/or indirectly via any of the aforementioned parties.

Another embodiment of the present invention is directed to using a forward contract (that includes a pair of put and a call options) to hedge an employer's non-qualified deferred compensation plan liabilities that are tied to the value of the employer's own stock.

In this regard its is noted that from a purely economic perspective, an employer is inherently hedged in respect of non-qualified deferred compensation plan liabilities determined by the value of the employer's own stock, because the employer can issue additional stock to satisfy such liabilities in full (setting aside securities law and dilution concerns). However, for financial accounting and tax purposes, the satisfaction of non-qualified deferred compensation plan liabilities reduces employer's earnings. Accordingly, the volatility of an employer's stock could increase the volatility of its earnings. Thus, to avoid such earnings volatility, an employer may find it desirable to hedge its non-qualified deferred compensation plan liabilities that are tied to the value of its own stock.

Thus, an employer need not necessarily explicitly hedge non-qualified deferred compensation plan liabilities tied to the value of the employer's own stock at all. However, should the employer choose to hedge such liabilities, the employer may do so under an embodiment of the present invention either by: (a) using a forward, whether in the form of a forward contract as such or in the form of a paired put and call (e.g., the employer may couple the purchase of a call with the sale of a put), the latter of which (i.e., the coupled call and put) is believed to have a more certain tax treatment; or (b) or by risking tax uncertainty and using a swap. Specifically, the tax treatment of the parties to a swap is unclear where the equity with respect to which the respective counterparties' obligations are calculated is the stock of one of the counterparties to the swap.

Of further note, special hedging rules under the Code regarding the character and timing of recognition of items of income, gain, deduction, and loss supersede the general rules applicable to certain transactions entered into in the ordinary course of a taxpayer's business. It is believed that the Total Return Swap between Employer and Counterparty according to the present invention will be subject to these special hedging rules.

More particularly, the application of the hedging rules has two important effects regarding the tax character (i.e., ordinary or capital) and timing of income. First, regardless of the character of a transaction on a stand-alone basis, under Treasury regulation section 1.1221-2(a), any gain or loss recognized by the employer on a swap generally will constitute ordinary income or loss and thus will match the ordinary character of the employer's deduction when the employee is paid.

Second, the hedging rules provide that the timing of recognition of the hedged transaction generally governs the timing of recognition on the hedging transaction. For example, in the absence of the hedging rules, the termination of a swap generally results in the recognition of gain or loss.

An equity swap generally would be deemed to be terminated (or partially terminated) to the extent that the parties to the swap changed the equity with respect to which the parties' obligations under the swap contract were calculated. In the case of a swap that hedged an employer's NQDC Liability, the assets with respect to which the employer's and the swap counterparty's obligations were calculated would be changed each time an employee changed its notional investment elections. However, recognizing gain or loss on a swap that is deemed terminated (or partially terminated) as a result of such an adjustment could precede by several years the employer's corresponding deduction upon paying that liability. Where the hedging rules apply, an employer's NQDC Liability would constitute a hedged transaction, and the employer's swap would constitute a hedging transaction.

Accordingly, it is believed that the application of the hedging rules generally should allow the employer to defer recognition of any gain or loss upon termination (or partial termination) of the swap until the employer pays off (and therefore takes a deduction in respect of) the hedged NQDC Liability.

Of further note, section 1032 of the Code generally provides that a corporation does not recognize taxable gain or loss on the receipt of cash or property in exchange for the issuance of its own stock or with respect to any lapse or acquisition of an option, or with respect to a securities futures contract, to buy or sell its stock (e.g., buy at $100 and sell at $150—no taxable gain; buy at $100 and sell at $50—no taxable loss). It is believed that the hedging rules (described above) should not affect the applicability of section 1032 to any put and call options that might be used to hedge NQDC Plan liabilities calculated with regard to the value of employer's stock.

However, the application of section 1032 to hedges of employer stock may create imperfect tax hedging. Specifically, the sum of the gain or loss on put and/or call options sold and purchased, respectively, to hedge NQDC Plan liabilities tied to the value of employer stock may not equal the amount of deferred compensation notionally invested in Employer Stock on an after-tax basis. For example, assume an employee defers $100 of compensation and requests that the deferred amount be notionally invested in employer stock, and assume further that the employer hedges its obligation with respect to this liability by purchasing a cash-settled call and selling a cash-settled put. Assume further that the employee never changes its notional investment out of employer stock, and that at the time the employer pays the employee, the value of that notional investment has gone down to $80. In such case, the employer would pay the employee $80 and take a corresponding deduction of $80. In addition, the holder of the put option would exercise it, thereby requiring the employer to deliver $20. (The employer would not exercise its call option, which would therefore expire worthless.) Despite the employer's economic loss of $20 resulting from the put's exercise, it is believed that Code section 1032 would prevent the employer from taking a tax deduction as a result of that loss.

This potential mismatch may be addressed by one embodiment of the present invention by having the employer purchase and sell, respectively, call and put options that cover a lesser number of shares of the employer's stock than employees have invested in notionally. For example, which example is intended to be illustrative and not restrictive, assume the employer's marginal rate of tax is 35 percent, and assume an employee requests that $1000 of compensation be notionally invested in employer stock, which is valued at $10 per share at such time. The employer could enter into put and call options with respect to fewer than 100 shares (e.g., only 65 shares). If the employer's stock price fell to $5 per share at the time of the NQDC Plan payment to the employee, the employer would pay the employee $500. Because that $500 payment would be fully deductible and would therefore offset $500 of income that would otherwise be taxed at 35 percent, the after-tax cost of the $500 payment would be $325, i.e., [$500*(1-0.35)]. At the same time, the employer would realize a loss of $325 on the put option (i.e., 65 shares*$5 loss per share), which loss would not be recognized for tax purposes. (The call option would expire worthless.) As a result, the net after-tax expense to the employer would be $650 (i.e., $325 after-tax deferred-compensation expense plus $325 nondeductible loss on the put option), for an overall after-tax expense of $650. By way of comparison, a fully-hedged deferred-compensation liability that is tied to something other than employer stock and is based on an initial deferral amount of $1000 will also have an after-tax expense of $650, because even though any decrease below $1000 would reduce the amount payable to the employee, the hedge would obligate the employer to pay an amount (and therefore entitle the employer to a deduction) equal to the amount of such decrease. The after-tax results would be the same in such case in the event employer stock increased in value.

While a number of embodiments of the present invention have been described, it is understood that these embodiments are illustrative only, and not restrictive, and that many modifications may become apparent to those of ordinary skill in the art. For example, while the present invention has been described primarily with reference to a single Plan Participant, any desired number of Plan Participants may, of course, be enrolled in the deferred compensation plan. Further, when multiple Plan Participants are enrolled in the deferred compensation plan, any information corresponding thereto (e.g., the investment allocation instructions) may be communicated individually by Plan Participant or may be communicated in the aggregate. Further still, while the present invention has been described primarily with reference to two Balance Sheet Providers, any desired number of Balance Sheet Providers may, of course, be used. Further still, when multiple Balance Sheet Providers and used, each may account for any desired portion of the underlying assets (e.g., each Balance Sheet Provider may directly own any desired portion of the underlying assets and/or each Balance Sheet Provider may own equity in the Trust corresponding to any desired portion of the underlying assets). For example, each Balance Sheet Provider may be associated with equal percentages of the total underlying assets or each Balance Sheet Provider may be associated with non-equal percentages of the total underlying assets, or some Balance Sheet Provider(s) may be associated with equal percentages of the total underlying assets while other Balance Sheet Provider (s) may be associated with non-equal percentages of the total underlying assets. Further still, while the present invention has been described primarily with reference to one Counterparty, any desired number of Counterparties may, of course, be used. Further still, when multiple Counterparties and used, each may account for any desired portion of the underlying assets. For example, each Counterparty may be associated with equal percentages of the total underlying assets or each Counterparty may be associated with non-equal percentages of the total underlying assets, or some Counterparties (or Counterparty) may be associated with equal percentages of the total underlying assets while other Counterparties (or Counterparty) may be associated with non-equal percentages of the total underlying assets. Further still, the payment of the fee to the counterparty(s) (e.g., the LIBOR based fee) may be made once or may be made multiple times (e.g., on predetermined calendar dates and/or periodically, such as monthly, quarterly, or yearly, for example). Further still, the investment allocation instructions made by the Plan Participant may include allocation instructions in connection with certain mutual funds and/or certain market indices (e.g., S&P 500, Russell 2000), and/or certain individual securities (e.g., individual stocks and/or individual bonds), and/or certain money market funds. Further still, the Trust through which a Balance Sheet Provider may invest according to the present invention may be any desired type of trust (e.g., an SPV Trust). Further still, for the purposes of the present application the term "notional amount" is intended to include, but not be limited to, a number used as a reference point for an obligation (wherein such reference point does not necessarily obligate a physical purchase or sale). Further still, the employer may be a publicly held corporation with one or more non-qualified deferred compensation plans. Further still, the employer may be a closely held corporation with one or more non-qualified deferred compensation plans. Further still, a Balance Sheet Provider according to the present invention may be any desired party (including, but not limited to, a company that administers deferred compensation plans as part of its day to day business). Further still, while the payment made by one party to another party as compensation for the "total return" of an underlying asset or assets has been described principally as a LIBOR based cashflow, any other payment or payments may, of course, be made. Further still, while the investment allocations have been described principally as notional investment allocations, any other type of investment allocations (e.g., non-notional investment allocations) may be used when desired and/or required. Further still, while the present invention has been described principally with respect to a method for hedging a liability associated with a deferred compensation plan a corresponding software program and/or system may of course be utilized to hedge a liability associated with a deferred compensation plan or to help to hedge a liability associated with a deferred compensation plan.

What is claimed is:

1. A method implemented by a programmed computer system for hedging a plan sponsor's non-qualified deferred compensation liabilities, wherein the plan sponsor's liabilities to each participant in the plan represents an unsecured general obligation of the plan sponsor arising from a deferral of receipt of at least a portion of participant's compensation and notional investment of an amount of the preferred compensation in at least one reference fund selected from a group of reference funds made available by the plan sponsor, comprising:

a) arranging a total return swap between a plan sponsor and a counterparty to hedge at least a portion of the plan sponsor's deferred compensation plan liabilities which fluctuate with the market performance of at least one of the reference funds in which at least one participant in the deferred compensation plan is notionally invested;

(b) identifying a notional principal amount, an adjusted notional principal amount, a periodic payment, and a periodic value-based payment;

(c) determining the notional principal amount for the swap based on summing at least a portion of an accumulated deferred compensation plan's liabilities for each participant in the plan;

(d) calculating on the computer the adjusted notional principal amount by adding or subtracting to the notional principal amount an additional amount of deferred compensation, distributions, gains or losses or other adjustments;

(e) calculating and tracking on the computer the periodic payment equal to an interest rate or other form of payment plus a spread applied to the adjusted notional principal amount;

(f) settling the periodic payment from the plan sponsor to the counterparty or its agent under the arranged total return swap;

(g) determining the periodic value-based payment under the arranged total return swap; and (h) settling the periodic value-based payment between the plan sponsor and the counterparty or its agent under the arranged total return swap.

* * * * *

UNITED STATES PATENT AND TRADEMARK OFFICE
CERTIFICATE OF CORRECTION

PATENT NO. : 6,766,303 B2
DATED : July 20, 2004
INVENTOR(S) : David J. Marshall

It is certified that error appears in the above-identified patent and that said Letters Patent is hereby corrected as shown below:

<u>Column 18,</u>
Line 7, the word "preferred" should be changed to -- deferred --

Signed and Sealed this

Fifth Day of October, 2004

JON W. DUDAS
*Director of the United States Patent and Trademark Office*